(12) United States Patent
Juang

(10) Patent No.: US 7,970,434 B2
(45) Date of Patent: Jun. 28, 2011

(54) DUAL-MODE PHONE AND CALLING METHOD

(75) Inventor: Jr-Fu Juang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 494 days.

(21) Appl. No.: 12/198,876

(22) Filed: Aug. 26, 2008

(65) Prior Publication Data

US 2009/0258670 A1 Oct. 15, 2009

(30) Foreign Application Priority Data

Apr. 11, 2008 (CN) .......................... 2008 1 0301060

(51) Int. Cl.
*H04M 1/00* (2006.01)

(52) U.S. Cl. ................... 455/552.1; 455/418; 455/435.3

(58) Field of Classification Search .................. 455/417, 455/418, 435.1, 435.2, 435.3, 550.1, 552.1
See application file for complete search history.

(56) References Cited

U.S. PATENT DOCUMENTS

| 6,816,719 | B1* | 11/2004 | Heinonen et al. | 455/403 |
| 6,999,770 | B2* | 2/2006 | Hirsbrunner et al. | 455/445 |
| 7,149,521 | B2* | 12/2006 | Sundar et al. | 455/435.1 |
| 7,177,597 | B2* | 2/2007 | Jung et al. | 455/41.3 |
| 7,586,878 | B2* | 9/2009 | Hsu et al. | 370/331 |

FOREIGN PATENT DOCUMENTS

CN 1741647 A 3/2006

* cited by examiner

*Primary Examiner* — Nhan Le
(74) *Attorney, Agent, or Firm* — Frank R. Niranjan

(57) ABSTRACT

A dual-mode phone includes a mobile phone antenna, a mobile phone module, a WLAN antenna, a WLAN module, a processing module, a memory, and a user interface. The processing module sets a communication mode of the dual-mode phone. The memory stores the communication mode and a phone book, wherein the phone book includes a plurality of mobile phone numbers, a plurality of WLAN phone addresses, mapping relationships between the plurality of mobile phone numbers and the plurality of WLAN phone addresses, and statuses of dual-mode phones corresponding to the plurality of WLAN phone addresses. The user interface receives an input phone number. The processing module further determines if the input phone number is a mobile phone number, determines if the mobile phone number has a mapping WLAN phone address, and calls the mapping WLAN phone address via the WLAN module.

20 Claims, 6 Drawing Sheets

DUAL-MODE PHONE AND CALLING METHOD

BACKGROUND

1. Field of the Invention

Embodiments of the present disclosure relate to dual-mode phones and, more particularly, to a dual-mode phone system and a dual-mode phone communication method.

2. Description of Related Art

Single-mode phones utilize global system for mobile communication (GSM) or code division multiple access (CDMA) in order to support normal communication. With an increasing number of mobile phone users, cellular communication networks may become overloaded. As a result, users may experience inconvenient abnormalities during phone calls. Additionally, service providers of cellular communication networks spend a significant amount of money on spectrum and base stations, which indirectly increases communication costs for an end user.

As a result, developers have created dual-mode phones supporting cellular communication networks as well as wireless local access networks (WLAN). When dual-mode phones are operating in WLAN mode, they are utilizing voice over internet protocol (VoIP) technology. Specifically, they encapsulate audio signals to be transmitted over the Internet without support from cellular communication networks and mobile stations. As a result, communication costs are decreased. However, issues concerning seamless switching of dual-mode phones between cellular communication networks and WLAN should be resolved.

SUMMARY

A dual-mode phone includes a mobile phone antenna, a mobile phone module, a wireless local area network (WLAN) antenna, a WLAN module, a processing module, a memory, and a user interface. The mobile phone antenna is configured for receiving and transmitting radio frequency (RF) signals sent over cellular communication networks. The mobile phone module is configured for processing the RF signals sent over the cellular communication networks. The WLAN antenna is configured for receiving and transmitting RF signals sent over a WLAN. The WLAN module is configured for processing the RF signals sent over the WLAN. The processing module is configured for setting a communication mode of the dual-mode phone. The communication mode includes a mobile communication mode, a WLAN priority mode, and a mobile phone and WLAN independent mode. The memory is configured for storing the communication mode and a phone book of the dual-mode phone. The phone book includes a plurality of mobile phone numbers, a plurality of WLAN phone addresses, mapping relationships between the plurality of mobile phone numbers and the plurality of WLAN phone addresses, and statuses of dual-mode phones corresponding to the plurality of WLAN phone addresses. The user interface is configured for receiving a user input phone number. The processing module determines if the input phone number is a mobile phone number, and determines if the mobile phone number has a mapping WLAN phone address. If the input mobile phone number has a mapping WLAN phone address, the processing module calls the mapping WLAN phone address via the WLAN module.

Other advantages and novel features will become more apparent from the following detailed description when taken in conjunction with the accompanying drawings:

DETAILED DESCRIPTION OF CERTAIN INVENTIVE EMBODIMENTS

Figure 1:
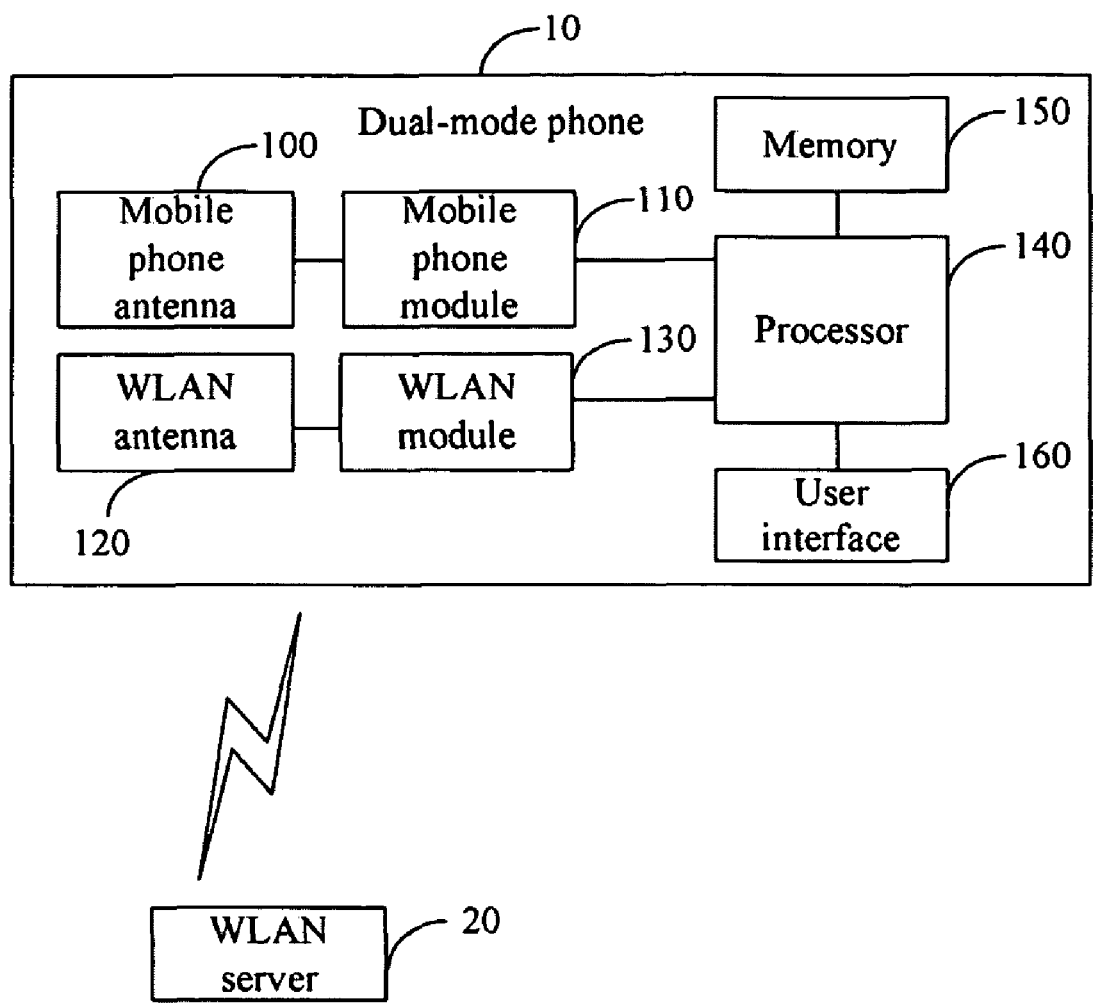
FIG. 1 is a schematic diagram of one embodiment of a dual-mode phone of the present disclosure.

FIG. 1 is a schematic diagram of one embodiment of a dual-mode phone 10 of the present disclosure. In one embodiment, the dual-mode phone 10 may be a cellular communication network/WiFi dual-mode phone, which can call via either cellular communication networks or wireless local area networks (WLAN). The dual-mode phone 10 includes a mobile phone antenna 100, a mobile phone module 110, a WLAN antenna 120, a WLAN module 130, a processing module 140, a memory 150, and a user interface 160.

The mobile phone antenna 100 is configured for receiving and transmitting radio frequency (RF) signals sent over cellular communication networks. In one embodiment, the cellular communication networks may include global system for mobile communication (GSM), code division multiple access 2000 (CDMA 2000), and wideband CDMA (WCDMA).

The mobile phone module 110 is connected to the mobile phone antenna 100 and is configured for processing the RF signals sent over the cellular communication networks. In one embodiment, the mobile phone module 110 processes received RF signals by the mobile phone antenna 100 and generates RF signals to transmit outbound via the mobile phone antenna 100.

The WLAN antenna 120 is configured for receiving and transmitting RF signals sent over the WLAN. In one exemplary embodiment, the WLAN antenna 120 may radiate RF signals with frequencies of 2.4 G and 5 G. The WLAN module 130 is connected to the WLAN antenna 120 and is configured for processing the RF signals sent over the WLAN. In one embodiment, the WLAN module 130 processes RF signals received by the WLAN antenna 120 and generates RF signals to transmit outbound via the WLAN antenna 120. In one embodiment, the WLAN module 130 supports IEEE 802.11a/b/g.

The processing module 140 is connected to the mobile phone module 110 and the WLAN module 130 and configured for controlling operations of the dual-mode phone 10, such as setting a communication mode for the dual-mode phone 10. The communication mode includes a mobile communication mode, a WLAN priority mode, a mobile phone and WLAN independent mode. In one embodiment, if dual-mode phone 10 is in the mobile communication mode, the dual-mode phone 10 can only communicate via cellular communication networks since it has not been registered to a WLAN server 20. If the dual-mode phone 10 is in the mobile phone and WLAN independent mode, the dual-mode phone 10 can communicate via cellular communication networks or WLAN, where mobile communications and WLAN communications are independent. If in the WLAN priority mode and the dual-mode phone 10 dials a mobile phone number, the dual-mode phone 10 initially determines if the dialed mobile phone number has a mapping WLAN phone address, and switches to the WLAN and dials the mapping WLAN phone address if the dialed mobile phone number has the mapping WLAN phone address.

The memory 150 is configured for storing the communication mode and a phone book of the dual-mode phone 10. The phone book includes a plurality of mobile phone numbers, a plurality of WLAN phone addresses, mapping relationships between the plurality of mobile phone numbers and the plurality of WLAN phone addresses, and statuses of dual-mode phones corresponding to the plurality of WLAN phone addresses. The statuses of dual-mode phones corresponding to the plurality of WLAN phone addresses include if the dual-mode phones have been registered to the WLAN server 20.

In one embodiment, the WLAN module 130 determines if the dual-mode phone 10 has been registered to the WLAN server 20 when the dual-mode phone 10 is powered on. The processing module 140 sends detection packets to the WLAN server 20 via the WLAN module 130, and the WLAN module 130 determines if responses from the WLAN server 20 have been received to determine if the dual-mode phone 10 has been registered to the WLAN server 20. If the WLAN module 130 receives the response from the WLAN server 20, the dual-mode phone 10 has been registered to the WLAN server 20. Accordingly, if the WLAN module 130 has not received the response from the WLAN server 20, the dual-mode phone 10 has not been registered the WLAN server 20. If the dual-mode phone 10 has not been registered to the WLAN server 20, the processing module 140 sets the communication mode to the mobile communication mode and continues to send detection packets to the WLAN server 20 via the WLAN module 130 to register to the WLAN server 20.

If the dual-mode phone 10 has been registered to the WLAN server 20, the WLAN module 130 receives statuses of the dual-mode phone corresponding to the plurality of WLAN phone addresses from the WLAN server 20. The processing module 140 correspondingly updates the phone book in the memory 150 and queries the memory 150 to determine if there is at least one mapping relationship between the plurality of mobile phone numbers and the plurality of WLAN phone addresses. If there is at least one mapping relationship between the plurality of mobile phone numbers and the plurality of WLAN phone addresses, the processing module 140 sets the communication mode of the dual-mode phone 10 to the WLAN priority mode. If there is not at least one mapping relationship between the plurality of mobile phone numbers and the plurality of WLAN phone addresses, the processing module 140 sets the communication mode of the dual-mode phone 10 to the mobile phone and WLAN independent mode.

The user interface 160 is configured for receiving a user input phone number. The processing module 140 is further configured for determining if the input phone number is a mobile phone number, and determining if the mobile phone number has a mapping WLAN phone address. If the input mobile phone number has a mapping WLAN phone address, the processing module 140 calls the mapping WLAN phone address via the WLAN module 130. In one embodiment, the processing module 140 queries the memory 150 to determine if the input mobile phone number has a mapping WLAN phone address, for determining if a dual-mode phone corresponding to the mapping WLAN phone address has been registered to the WLAN server 20. If the input mobile phone number does not have a mapping WLAN phone address, or the dual-mode phone corresponding to the mapping WLAN phone address has not been registered to the WLAN server 20, the processing module 140 calls the input mobile phone number via the mobile phone module 110. The processing module 140 further determines the type of communication mode employed before determining if the input phone number is a mobile phone number.

The communication mode of the dual-mode phone 10 may be changed because the WLAN module 130 continually registers to the WLAN server 20, thereby determining if the dual-mode phone 10 has been registered to the WLAN server 20. If the dual-mode phone 10 is in a communication session with a mobile phone number (hereinafter referred as mobile communication session), and the communication mode changes, the processing module 140 determines if the new communication mode is in the WLAN priority mode. If the new communication mode is not in the WLAN priority mode, the dual-mode phone 10 remains on the mobile communication session. If the new communication mode is in the WLAN priority mode, the processing module 140 further determines if the mobile phone number in the mobile communication session has a mapping WLAN phone address. If the mobile phone number in the mobile communication session does not have a mapping WLAN phone address, the dual-mode phone 10 remains on the mobile communication session. If the mobile phone number in the mobile communication session has a mapping WLAN phone address, the processing module 140 calls the mapping WLAN phone address via the WLAN module 130 and maintains the mobile communication session until a dual-mode phone corresponding to the mapping WLAN phone address answers the call.

If the dual-mode phone 10 is registered to the WLAN server 20 during the mobile communication session and receives a call from a WLAN phone address, the processing module 140 determines if there is a mapping relationship between the WLAN phone address and the mobile phone number in the mobile communication session. If there is no mapping relationship, the dual-mode phone 10 remains on the mobile communication. If there is a mapping relationship, the dual-mode phone 10 answers the call via the WLAN to maintain a normal WLAN communication session before disconnecting from the mobile communication session.

Figure 2A:
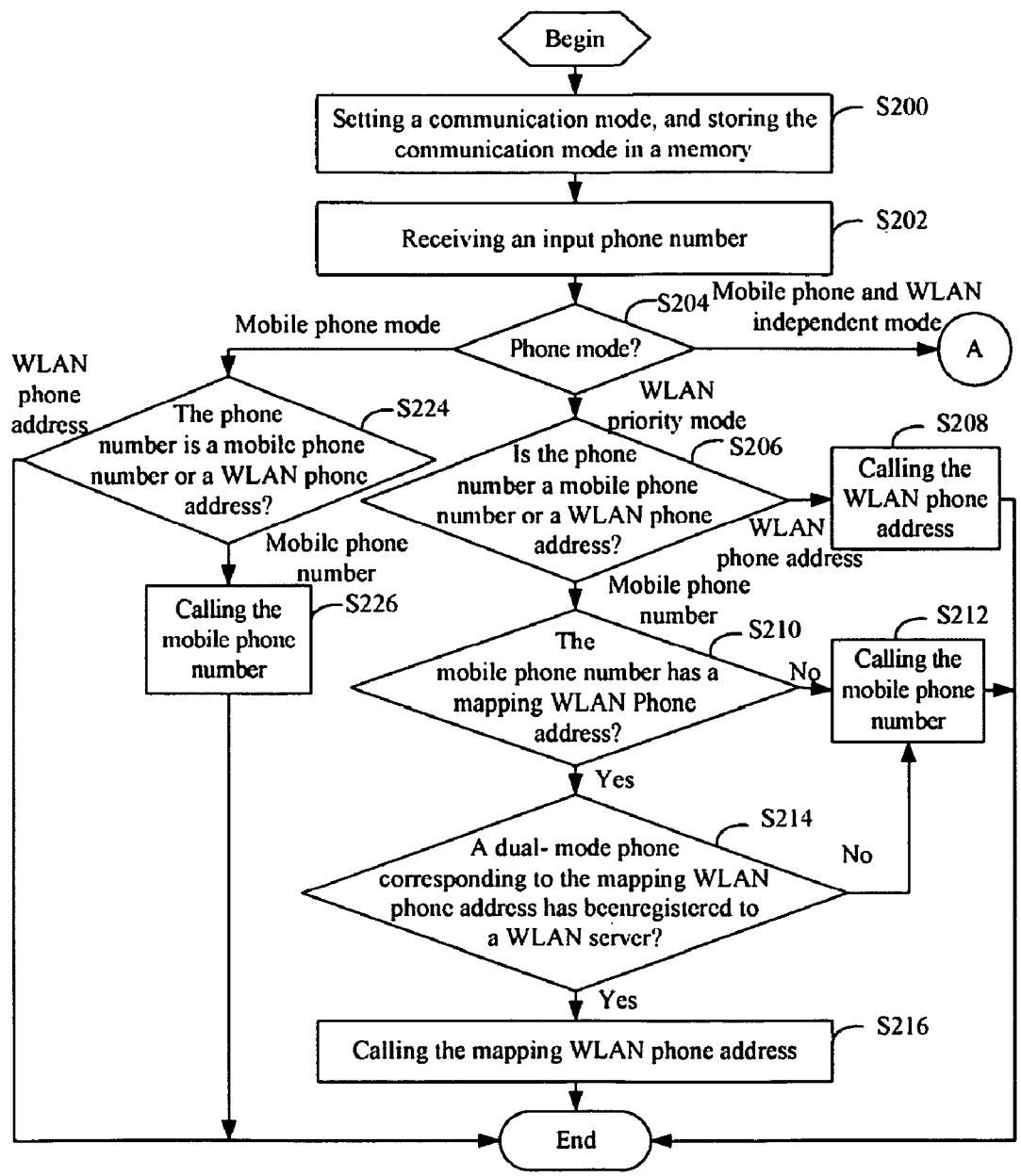
FIGS. 2A and 2B are flowcharts of one embodiment of a calling method of the present disclosure.
Figure 2B:
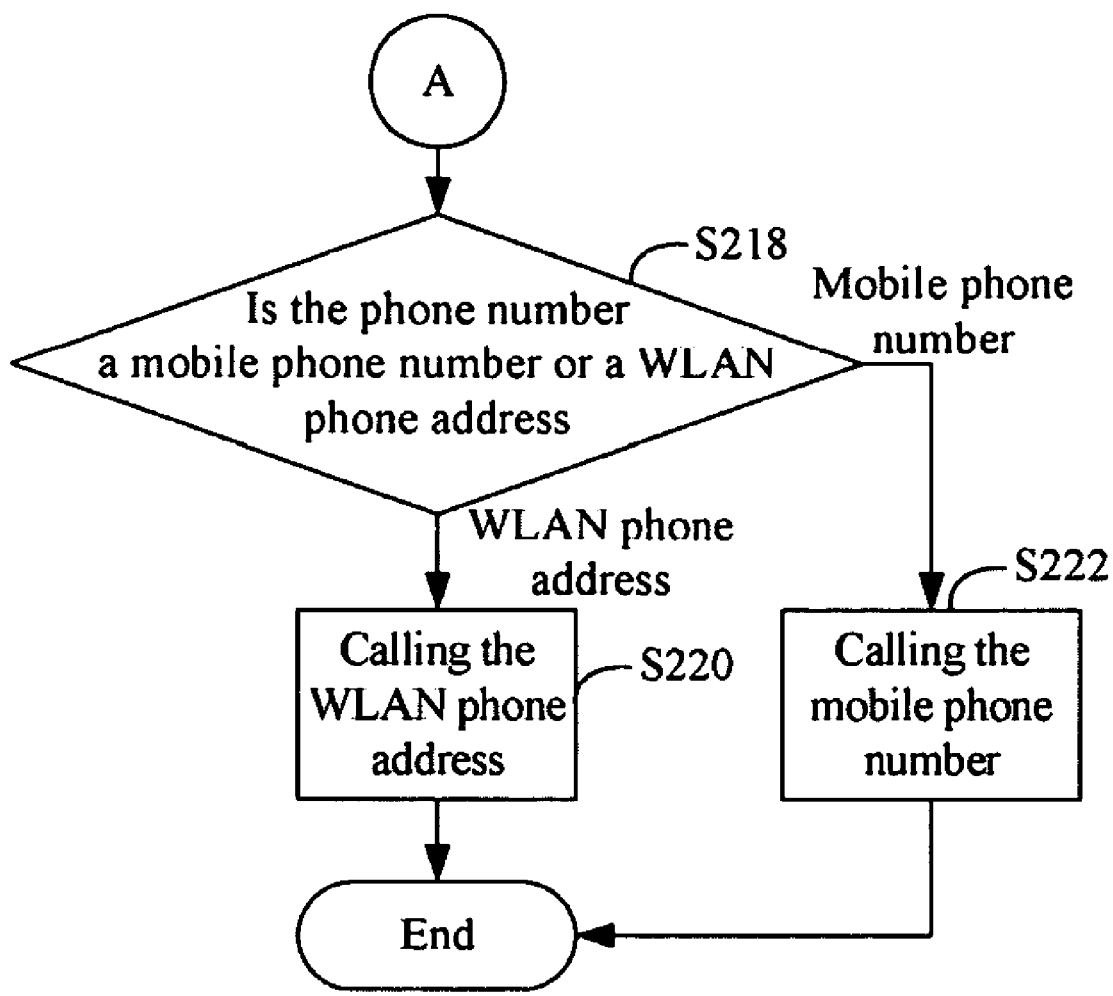

FIGS. 2A and 2B are flowcharts of one embodiment of a calling method of the dual-mode phone 10 of the present disclosure. Referring to FIG. 2A, in block S200, the dual-mode phone 10 sets a communication mode for the dual-mode phone 10 and stores the communication mode in the memory 150 when the dual-mode phone 10 is powered on. In block S202, the user interface 160 receives an input phone number. In block S204, the processing module 140 determines a type of the communication mode of the dual-mode phone 10. The communication mode includes the mobile communication mode, the WLAN priority mode, and the mobile phone and WLAN independent mode. In one embodiment, the processing module 140 queries the memory 150 to determine the type of the communication mode.

If the communication mode is in the WLAN priority mode, in block S206, the processing module 140 determines if the input phone number is a mobile phone number or a WLAN phone address. If the input phone number is a WLAN phone address, in block S208, the processing module 140 calls the input WLAN phone address via the WLAN module 130.

If the input phone number is a mobile phone number, in block S210, the processing module 140 determines if the input mobile phone number has a mapping WLAN phone address. If the inputted mobile phone number does not have a mapping WLAN phone addresses, in block S212, the processing module 140 calls the input mobile phone number via the mobile phone module 110.

If the input mobile phone number has a mapping WLAN phone address, in block S214, the processing module 140 determines if a dual-mode phone corresponding to the mapping WLAN phone address has been registered to the WLAN server 20. If the dual-mode phone corresponding to the mapping WLAN phone address has not been registered to the WLAN server 20, block S212 is executed. In block S212, the processing module 140 calls the input mobile phone number via the mobile phone module 110. If the dual-mode phone corresponding to the mapping WLAN phone address has been registered to the WLAN server 20, block S216 is executed, where the processing module 140 calls the mapping WLAN phone address via the WLAN module 130.

With reference to FIG. 2B, if the communication mode is in the mobile phone and WLAN independent mode, in block S218, the processing module 140 determines if the input phone number is a mobile phone number or a WLAN phone address. If the inputted phone number is a WLAN phone address, in block S220, the processing module 140 calls the input WLAN phone address via the WLAN module 130. If the input phone number is a mobile phone number, in block S222, the processing module 140 calls the input mobile phone number via the mobile phone module 110.

If the communication mode is in the mobile communication mode, in block S224, the processing module 140 determines if the input phone number is a mobile phone number or a WLAN phone address. If the input phone number is a mobile phone number, in block S226, the processing module 140 calls the input mobile phone number via the mobile phone module 110. If the input phone number is a WLAN phone address, the dual-mode phone 10 does not call, and the process ends.

Figure 3:
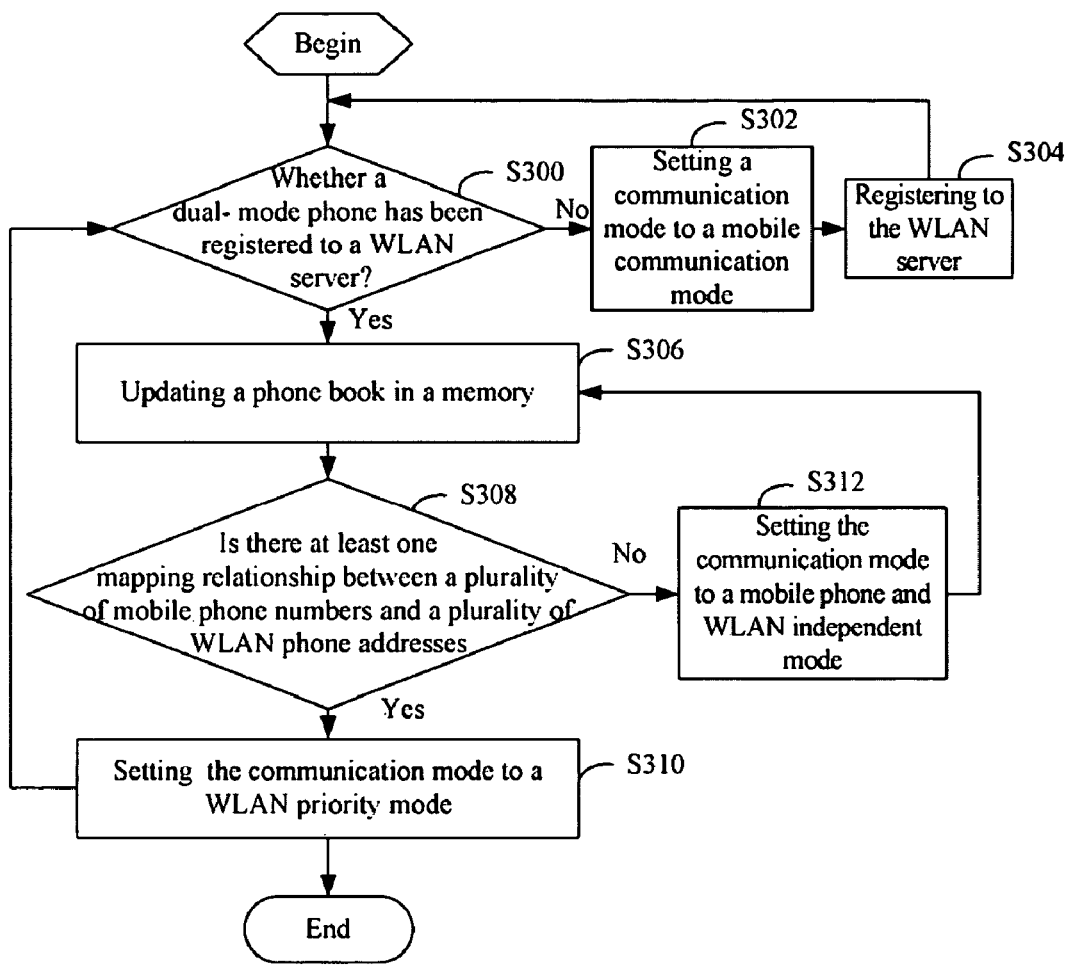
FIG. 3 is a flowchart of another embodiment of a calling method of the present disclosure.

FIG. 3 is a detailed flowchart of block S200 of FIG. 2. In block S300, the WLAN module 130 determines if the dual-mode phone 10 has been registered to the WLAN server 20. In one embodiment, the processing module 140 sends detection packets to the WLAN server 20 via the WLAN module 130, and the WLAN module 130 verifies if responses have been received from the WLAN server 20 to determine if the dual-mode phone 10 has been registered to the WLAN server 20. The WLAN module 130 continues to determine if the dual-mode phone 10 has been registered to the WLAN server 20 after the dual-mode phone 10 is powered on.

If the dual-mode phone 10 has not been registered to the WLAN server 20, in block S302, the processing module 140 sets the communication mode of the dual-mode phone 10 to the mobile communication mode. In block S304, the WLAN module 130 registers to the WLAN server 20, and block S300 is executed, where the WLAN module 130 continues to determine if the dual-mode phone 10 has been registered to the WLAN server 20.

If the dual-mode phone 10 has been registered to the WLAN server 20, in block S306, the WLAN module 130 receives statuses of the dual-mode phone corresponding to the plurality of WLAN phone addresses from the WLAN server 20, and the processing module 140 updates the phone book in the memory 150. In block S308, the processing module 140 queries the memory 150 to determine if there is at least one mapping relationship between the plurality of mobile phone numbers and the plurality of WLAN phone addresses.

If there is at least one mapping relationship between the plurality of mobile phone numbers and the plurality of WLAN phone addresses, in block S310, the processing module 140 sets the communication mode of the dual-mode phone 10 to the WLAN priority mode. If there are no mapping relationships between the plurality of mobile phone numbers and the plurality of WLAN phone addresses, in block S312, the processing module 140 sets the communication mode of the dual-mode phone 10 to the mobile phone and WLAN independent mode.

Figure 4:
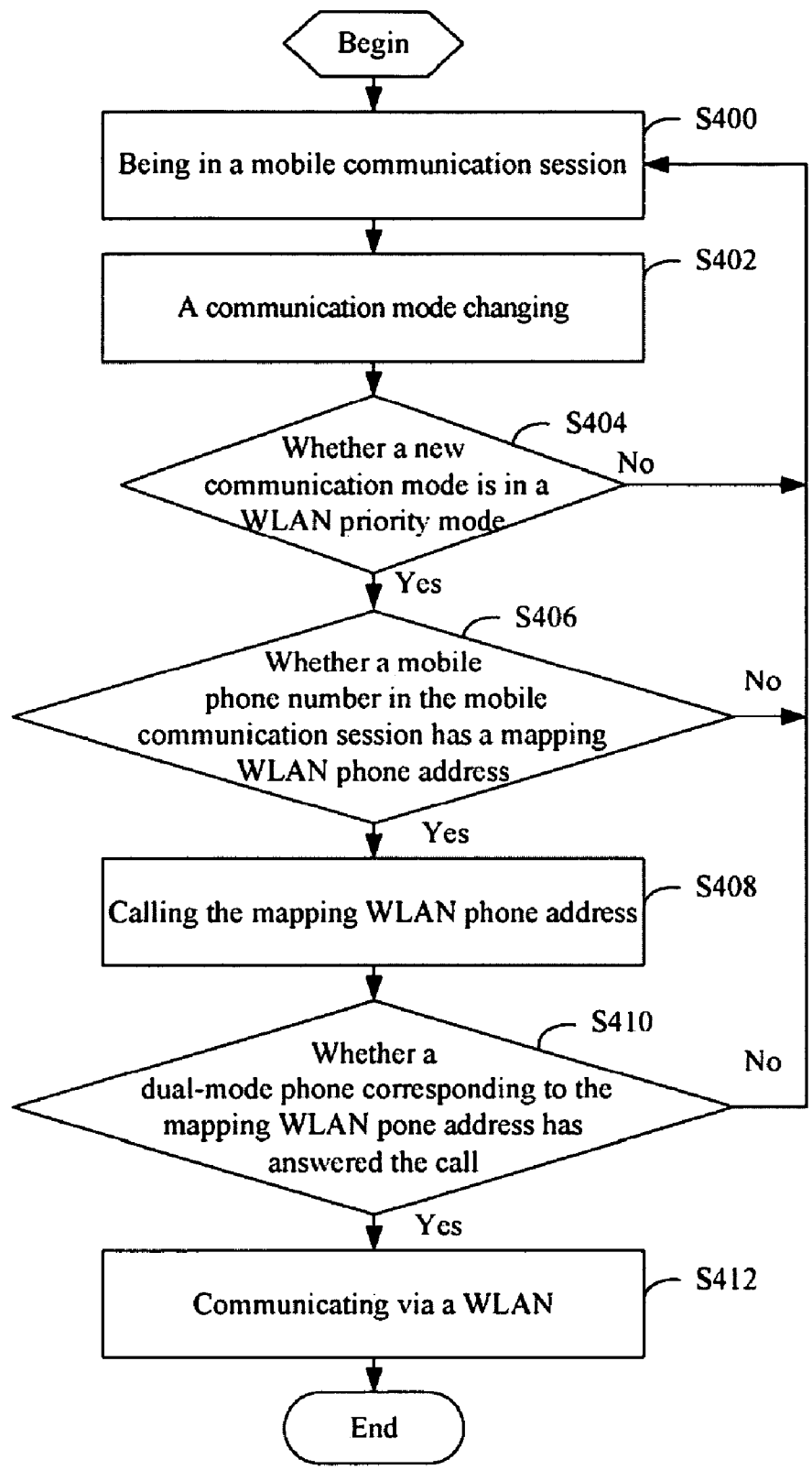
FIG. 4 is a flowchart of another embodiment of a calling method of the present disclosure.

FIG. 4 is a flowchart of one embodiment of a calling method of the present disclosure. In block S400, the dual-mode phone 10 is in a mobile communication session with a mobile phone number. In block S402, the communication mode of the dual-mode phone 10 changes. Since the WLAN module 130 continues to verify if the dual-mode phone 10 has been registered to the WLAN server 20, the communication mode may change. In block S404, the processing module 140 determines if the new communication mode is in the WLAN priority mode. If the new communication mode is not in the WLAN priority mode, block S400 is executed, where the dual-mode phone 10 continues the mobile communication session.

If the new communication mode is in the WLAN priority mode, in block S406, the processing module 140 further determines if the mobile phone number in the mobile communication session has a mapping WLAN phone address. If the mobile phone number in the mobile communication session has no mapping WLAN phone address, block S400 is executed, where the dual-mode phone 10 continues the mobile communication session. If the mobile phone number in the mobile communication session has a mapping WLAN phone address, in block S408, the processing module 140 calls the mapping WLAN phone address via the WLAN module 130. In one exemplary embodiment, the processing module 140 calls the mapping WLAN phone address via the WLAN module 130 after a delay period has elapsed.

In block S410, the WLAN module 130 determines if a dual-mode phone corresponding to the mapping WLAN phone address has answered the call. If a dual-mode phone corresponding to the mapping WLAN phone address has not answered the call, block S400 is executed. If a dual-mode phone corresponding to the mapping WLAN phone address has answered the call, in block S412, the dual-mode phone 10 and the dual-mode phone corresponding to the mapping WLAN phone address communicate with each other via the WLAN network.

Figure 5:
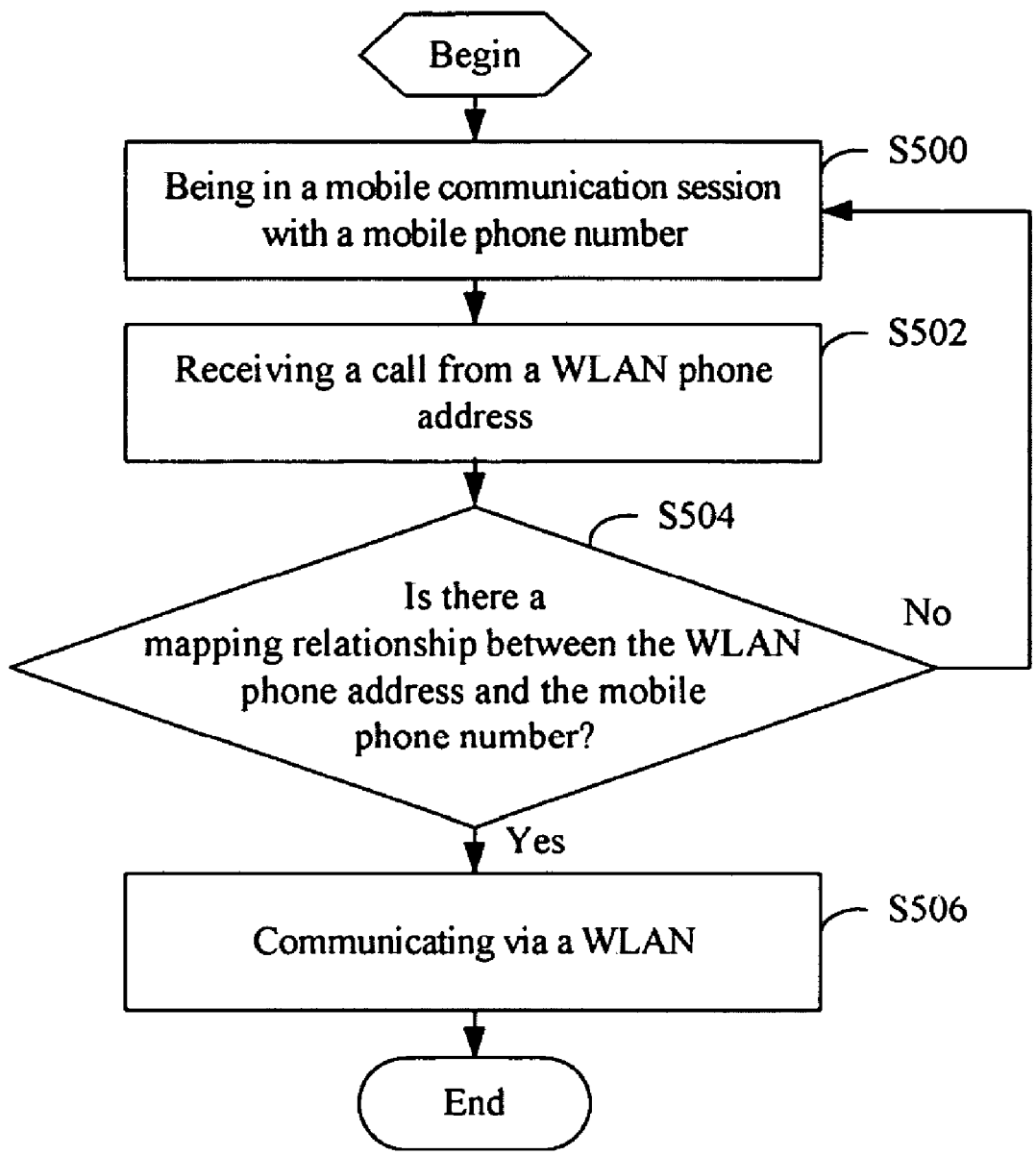
FIG. 5 is a flowchart of another embodiment of a calling method of the present disclosure.

FIG. 5 is a flowchart of one embodiment of a calling method of the present disclosure. In block S500, the dual-mode phone 10 is in a mobile communication session with a mobile phone number. In block S502, the WLAN module 130 receives a call corresponding to a WLAN phone address. In block S504, the processing module 140 determines if there is a mapping relationship between the WLAN phone address and the mobile phone number in the mobile communication session. If there is a mapping relationship, in block S506, the dual-mode phone 10 switches to communicate over the WLAN. In one embodiment, the dual-mode phone 10 does not disconnect from the mobile communication session until the WLAN communication session has been established. If there is no mapping relationships, block S500 is executed, where the dual-mode phone 10 continues the mobile communication session.

The dual-mode phone 10 employing the calling method of the present disclosure can automatically determine if an incoming or dialed mobile phone number has a mapping WLAN phone address for communicating over the WLAN, thereby decreasing communication costs.

The foregoing disclosure of various embodiments has been presented for purposes of illustration and description. It is not intended to be exhaustive or to limit the invention to the precise forms disclosed. Many variations and modifications of one embodiments described herein will be apparent to one of ordinary skill in the art in light of the above disclosure. The scope of the present disclosure is to be defined only by the claims appended hereto and their equivalents.

What is claimed is:

1. A dual-mode phone, comprising:
 a mobile phone antenna configured for receiving and transmitting radio frequency (RF) signals sent over a cellular communication network;
 a mobile phone module configured for processing said RF signals sent over the cellular communication network;
 a wireless local area network (WLAN) antenna configured for receiving and transmitting RF signals sent over a WLAN;
 a WLAN module configured for processing said RF signals sent over the WLAN;
 a processing module configured for setting a communication mode of the dual-mode phone, the communication mode comprising a mobile communication mode, a WLAN priority mode, and a mobile phone and WLAN independent mode;
 a memory configured for storing the communication mode and a phone book of the dual-mode phone, the phone book comprising a plurality of mobile phone numbers, a plurality of WLAN phone addresses, mapping relationships between the plurality of mobile phone numbers and the plurality of WLAN phone addresses, and statuses of dual-mode phones corresponding to the plurality of WLAN phone addresses; and
 a user interface configured for receiving a user input phone number;
 wherein the processing module is further configured for determining if the input phone number is a mobile phone number, determining if the mobile phone number has a mapping WLAN phone address, and calling the mapping WLAN phone address via the WLAN module upon the condition that the input mobile phone number has a mapping WLAN phone address.

2. The dual-mode phone of claim 1, wherein the WLAN module is further configured for determining if the dual-mode phone has been registered to a WLAN server and receiving the statuses of dual-mode phones corresponding to the plurality of WLAN phone addresses from the WLAN server upon the condition that the dual-mode phone has been registered to the WLAN server.

3. The dual-mode phone of claim 2, wherein the processing module is further configured for updating the phone book according to the statuses of dual-mode phones corresponding to the plurality of WLAN phone addresses received by the WLAN module.

4. The dual-mode phone of claim 2, wherein the processing module is configured for setting the communication mode to the mobile communication mode upon the condition that the dual-mode phone has not been registered to the WLAN server.

5. The dual-mode phone of claim 2, wherein the processing module is further configured for determining if a dual-mode phone corresponding to the mapping WLAN phone address has been registered to the WLAN server upon the condition that if the input mobile phone number has a mapping WLAN phone address.

6. The dual-mode phone of claim 2, wherein the processing module further queries the memory to determine if there is at least one mapping relationship between the plurality of mobile phone numbers and the plurality of WLAN phone addresses.

7. The dual-mode phone of claim 6, wherein the processing module sets the communication mode to the WLAN priority mode upon the condition that there is at least one mapping relationship between the plurality of mobile phone numbers and the plurality of WLAN phone addresses.

8. The dual-mode phone of claim 6, wherein the processing module sets the communication mode to the mobile phone and WLAN independent mode upon the condition that there is no mapping relationships between the plurality of mobile phone numbers and the plurality of WLAN phone addresses.

9. A calling method of a dual-mode phone, comprising:
 setting a communication mode of the dual-mode phone, and storing the communication mode in a memory, the communication mode comprising a mobile communication mode, a wireless local area network (WLAN) priority mode, and a mobile phone and WLAN independent mode;
 receiving an input phone number;
 determining a type of the communication mode;
 determining if the input phone number is a mobile phone number or a WLAN phone address upon the condition that the communication mode is the WLAN priority mode;
 determining if the input mobile phone number has a mapping WLAN phone address upon the condition that the input phone number is a mobile phone number; and
 calling the mapping WLAN phone address upon the condition that the input mobile phone number has a mapping WLAN phone address.

10. The calling method of claim 9, further comprising:
 determining if a dual-mode phone corresponding to the mapping WLAN phone address has been registered to a WLAN server; and
 calling the mapping WLAN phone address upon the condition that the dual-mode phone corresponding to the mapping WLAN phone address has been registered to a WLAN server.

11. The calling method of claim 10, further comprising:
 calling the input mobile phone number upon the condition that the dual-mode phone corresponding to the mapping WLAN phone address has not been registered to a WLAN server.

12. The calling method of claim 10, wherein the memory further stores a phone book comprising a plurality of mobile phone numbers, a plurality of WLAN phone addresses, mapping relationships between the plurality of the mobile phone numbers and the plurality of WLAN phone addresses, and statuses of dual-mode phones corresponding to the plurality of WLAN phone addresses.

13. The calling method of claim 12, wherein the block of setting a communication mode of the dual-mode phone comprises:
 determining if the dual-mode phone has been registered to the WLAN server;
 receiving the statuses of dual-mode phone corresponding to the plurality of WLAN phone addresses from the WLAN server, and updating the phone book upon the condition that the dual-mode phone has been registered to the WLAN server;
 determining if there is at least one mapping relationship between the plurality of mobile phone numbers and the plurality of WLAN phone addresses; and
 setting the communication mode to the WLAN priority mode upon the condition that there is at least one mapping relationship between the plurality of mobile phone numbers and the plurality of WLAN phone addresses.

14. The calling method of claim 13, wherein the block of setting a communication mode of the dual-mode phone comprises:

setting the communication mode to the mobile phone and WLAN independent mode upon the condition that there is no mapping relationships between the plurality of mobile phone numbers and the plurality of WLAN phone addresses.

15. The calling method of claim 13, wherein the block of setting a communication mode of the dual-mode phone comprises:

setting the communication mode to the mobile communication mode upon the condition that the dual-mode phone has not been registered to the WLAN server; and continually registering to the WLAN server.

16. The calling method of claim 9, further comprising:

determining if the input phone number is a mobile phone number or a WLAN phone address upon the condition that the communication mode is in the mobile phone and WLAN independent mode;

calling the input WLAN phone address upon the condition that the input phone number is a WLAN phone address; and calling the input mobile phone number upon the condition that the input phone number is a mobile phone number.

17. The calling method of claim 9, further comprising:

determining if the input phone number is a mobile phone number upon the condition that the communication mode is in the mobile communication mode; and calling the input mobile phone number upon the condition that the input phone number is a mobile phone number.

18. The calling method of claim 9, further comprising:

calling the input WLAN phone address upon the condition that the input phone number is a WLAN phone address.

19. The calling method of claim 9, further comprising:

calling the input mobile phone number upon the condition that the input mobile phone number has no mapping WLAN phone addresses.

20. A calling method of a dual-mode phone, the dual-mode phone in a mobile communication session with a mobile phone number, the calling method comprising:

changing a communication mode of the dual-mode phone to a new communication mode;

determining if the new communication mode is in a WLAN priority mode;

determining if the mobile phone number in the mobile communication session has a mapping WLAN phone address upon the condition that the new communication mode is in the WLAN priority mode; and calling the mapping WLAN phone address upon the condition that the mobile phone number in the mobile communication session has a mapping WLAN phone address.

* * * * *